Figure 1:
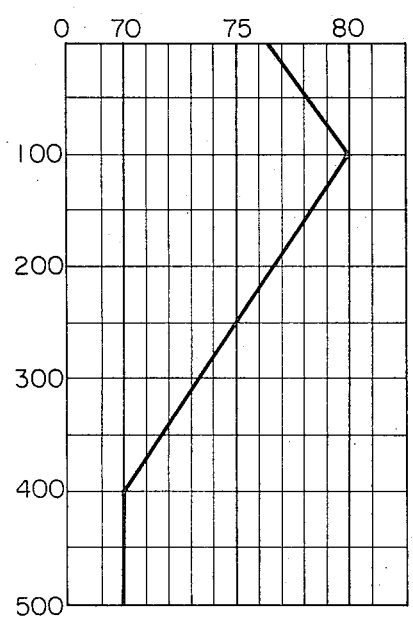

United States Patent [19]

Marutani

[11] 3,832,537
[45] Aug. 27, 1974

[54] METHOD AND APPARATUS FOR COMPUTING AND DISPLAYING SOUND RAYS OF A SONAR SYSTEM

[75] Inventor: Yasumasa Marutani, Tokyo, Japan

[73] Assignee: Oki Electric Industry Co., Ltd., Tokyo, Japan

[22] Filed: Aug. 23, 1973

[21] Appl. No.: 390,681

[30] Foreign Application Priority Data
Sept. 5, 1972   Japan................................ 47-88388

[52] U.S. Cl................ 235/193, 181/.5 AP, 340/3 R
[51] Int. Cl............................................. G06g 7/12
[58] Field of Search ......... 444/1; 235/193; 340/3 R, 340/3 C, 3 E, 6 R, 7 PC; 181/.5 ED, .5 AP

[56] References Cited
UNITED STATES PATENTS
3,757,287   9/1973   Bealor, Jr............................ 340/3 R OTHER PUBLICATIONS
Rubin & Graber, "Acoustic Ray Tracing on the General–Purpose Electronic Analog Computer," IEEE Trans. on Computers, Vol. EC-14, June 1965, pp. 443–455.

Primary Examiner—Malcolm A. Morrison
Assistant Examiner—Jerry Smith
Attorney, Agent, or Firm—Paul & Paul

[57] ABSTRACT

A method and apparatus for analyzing sound ray paths of a sonar system by an analog computing method is disclosed wherein the transmission loss (Nw) of a sound wave is compared with the value of a figure of merit ($N_{FM}$) of the sonar system. Sound rays within the detection range of the sonar system are displayed by solid lines while sound rays out of the detection range are displayed by broken lines. Thus ray paths and detection ranges of the sonar system are displayed at the same time.

7 Claims, 14 Drawing Figures

METHOD AND APPARATUS FOR COMPUTING AND DISPLAYING SOUND RAYS OF A SONAR SYSTEM

The present invention relates to a method and apparatus for simulation, in particular, it relates to a method and apparatus for simulation for computing and displaying sound ray paths transmitted into sea-water in a sonar system.

Sonar (Sound Navigation and Ranging) has been used for locating schools of fish, detecting enemy submarines and navigating ships. There are two kinds of sonars, active sonar and passive sonar. The former transmits ultrasonic waves into sea-water and finds the direction and distance of an object from which wave is reflected by the propagation time and direction of the ultrasonic wave, while the latter finds them from the sound waves which are radiated by the object itself.

A sonar is, generally, designed on the premise that sound waves propagate straight in sea-water. However, sound waves in sea-water actually do not propagate straight but rather, curve because of the temperature and pressure distribution in sea-water. Accordingly, there appears some areas in which an object can not be found.

Sound ray paths in sea-water have long been manually computed with a calculating table, however, this method is extremely troublesome and time consuming. Accordingly, an automatic sound ray path analyzer has been developed. The prior sound ray path analyzer, which is a special purpose analog computer, calculates the sound ray path of a sonar system from the information of temperature and depth provided by a B/T (Bathy-Thermograph) and displays the sound ray path on a screen of a cathode-ray tube or a pen-type X-Y recorder.

One disadvantage of the prior sound ray path analyzer is that the entire sound ray path is displayed with solid or full lines. Accordingly the operator of a sonar, incorrectly believes that the entire area displayed on a screen with solid lines is within the detection range of the sonar.

Another disadvantage of the prior art is that the boundary of the detection range is not displayed.

It should be noted that the energy density of a sound wave in sea-water is attenuated because of loss due to diffusion, absorption and reflection and, accordingly, the energy density of a sound wave decreases as it moves further from the sound source. As a result, the detection range of a sonar is limited to the effective search distance where the energy density is large enough for the sonar to detect the sound wave.

The detection range of a sonar depends on the frequency of the sound wave and the value of a figure of merit ($N_{FM}$) of the sonar. However, the boundary of the detection range of the sonar can not be displayed with a simple curve, since the scales of distance and depth on a screen of a display unit differ, depending upon the amount of reduction or enlargement of the fluid of view.

Accordingly, the principle object of the present invention is to provide a new and improved method and apparatus for computing and displaying the sound ray paths of a sonar system, which overcome the above mentioned drawbacks.

Another object of the present invention is to provide a method for computing and displaying sound rays on a screen wherein the sound rays within the detection range of the sonar system are discriminated from those which are out of the detection range.

A further object of the present invention is to provide a method for computing and displaying sound rays wherein the sound rays on a screen out of the detection range of the sonar system are displayed with broken lines.

A still further object of the present invention is to provide a method for computing and displaying sound rays wherein the sound rays on a screen out of the detection range of the sonar system are displayed with lines of equal length dashes.

A still further object of the present invention is to provide a method for computing and displaying sound rays wherein the boundary of the detection range of the sonar system is displayed on a screen with a marker.

A still further object of the present invention is to provide a method for computing and displaying sound rays wherein the sound rays which are out of the detection range are blanked out from a screen.

The above and other objects are attained by a method for computing and displaying sound rays of a sonar system by an analog computing method including the steps of computing the transmission loss (Nw) of a sound wave at the same time as the computation of the sound ray, setting a value of a figure of merit ($N_{FM}$) of the sonar system, comparing said transmission loss (Nw) with said figure of merit ($N_{FM}$), and displaying the computed sound ray on a display unit discriminating the sound ray within the detection range from that out of the detection range. The distance that the transmission loss (Nw) is equal to the figure of merit ($N_{FM}$) is regarded as the boundary of the detection range, since an object at that distance can be found with a 50 percent probability.

Further features and advantages of the present invention will be apparent from the ensuing description with reference to the accompanying drawings to which, however, the scope of the invention is in no way limited.

Figure 2:
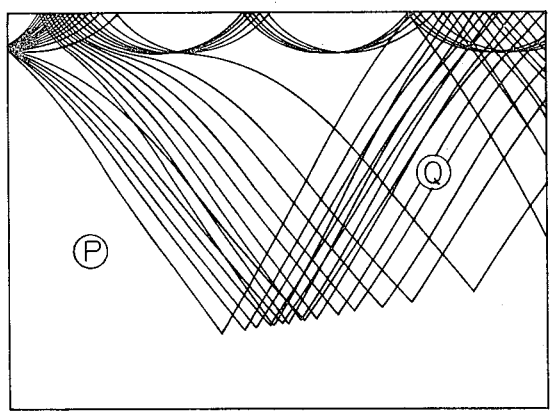

FIG. 1 shows one example of the relationship between the sea-depth and the temperature of sea-water, FIG. 2 shows one embodiment of sound ray path curves displayed by prior art.

Figure 3:
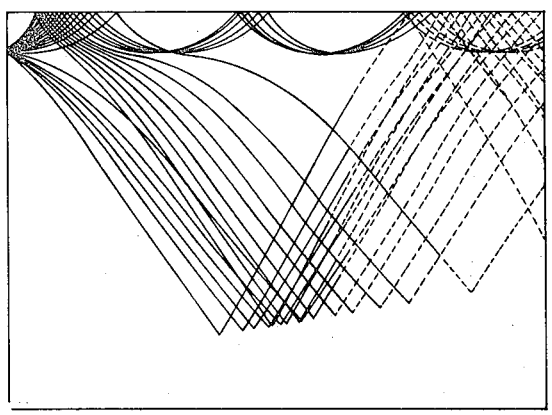
Figure 4:
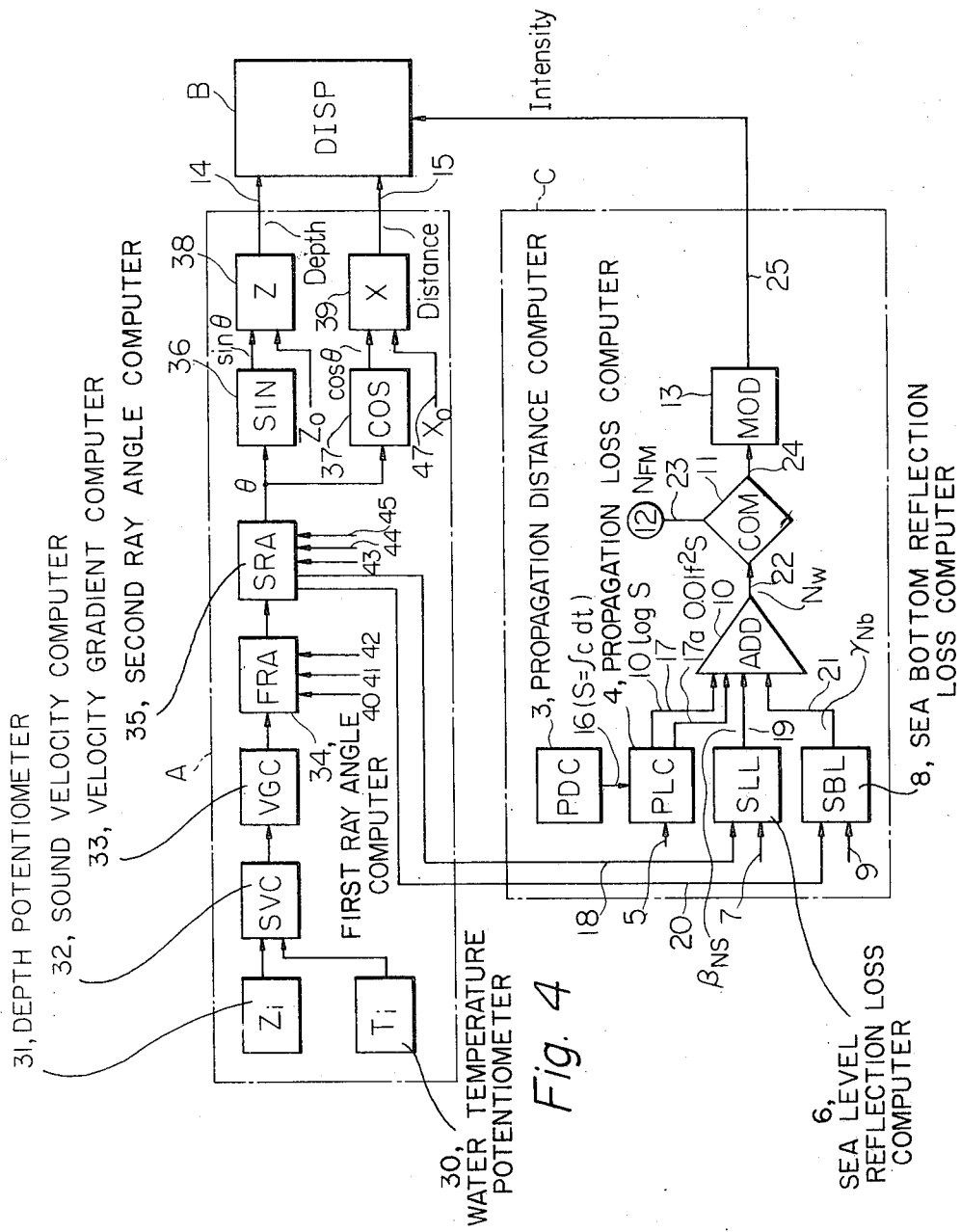
Figure 5A:
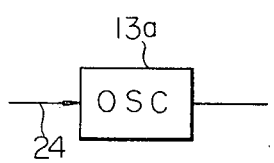
Figure 5B:
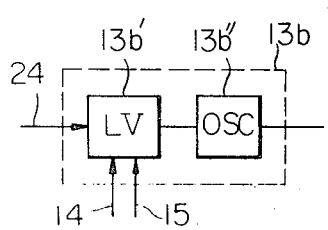
Figure 5C:
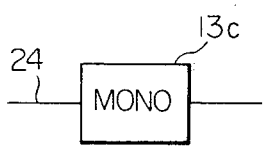
Figure 5D:
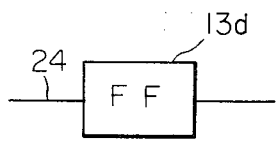
Figure 6A:
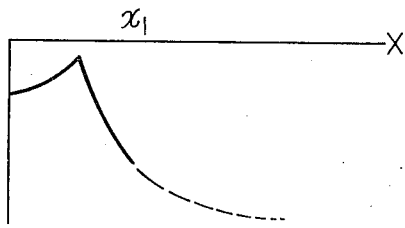
Figure 6B:
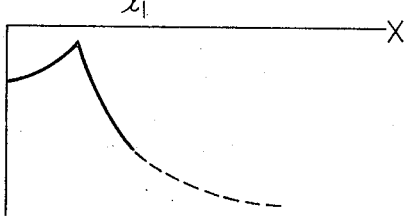
Figure 6C:
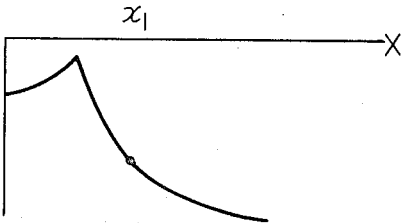
Figure 6D:
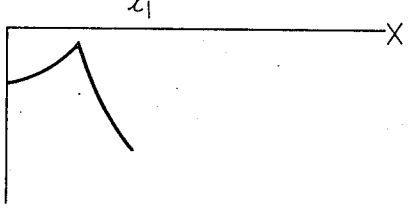
Figure 7:
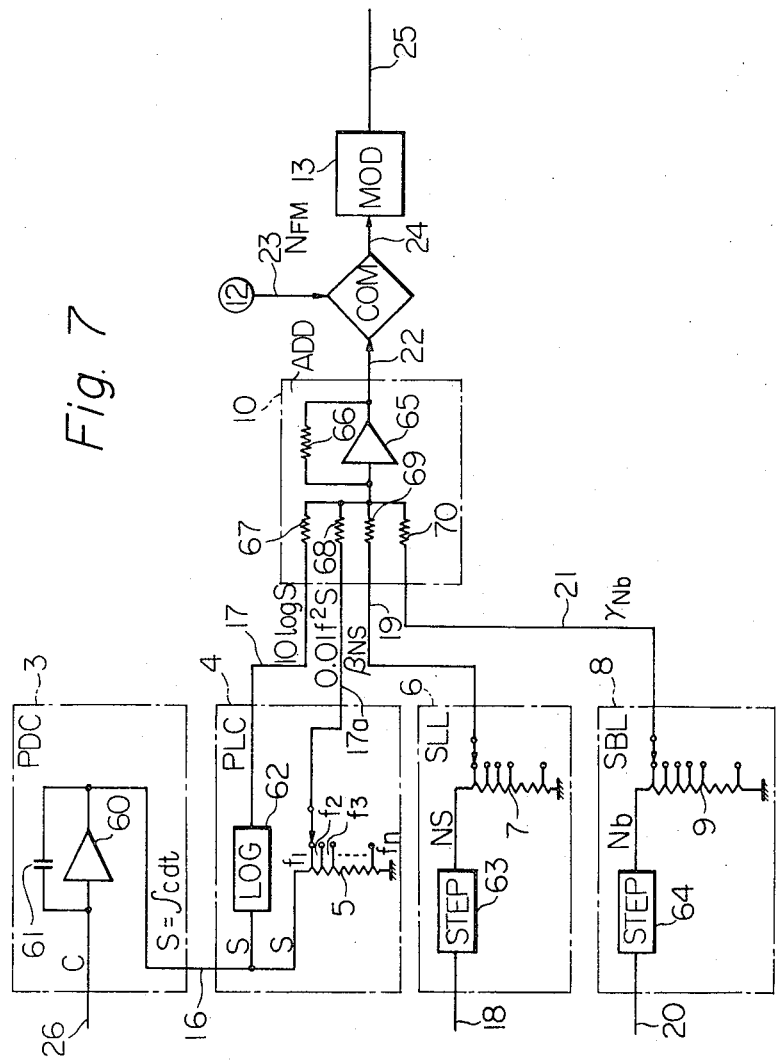
Figure 8:
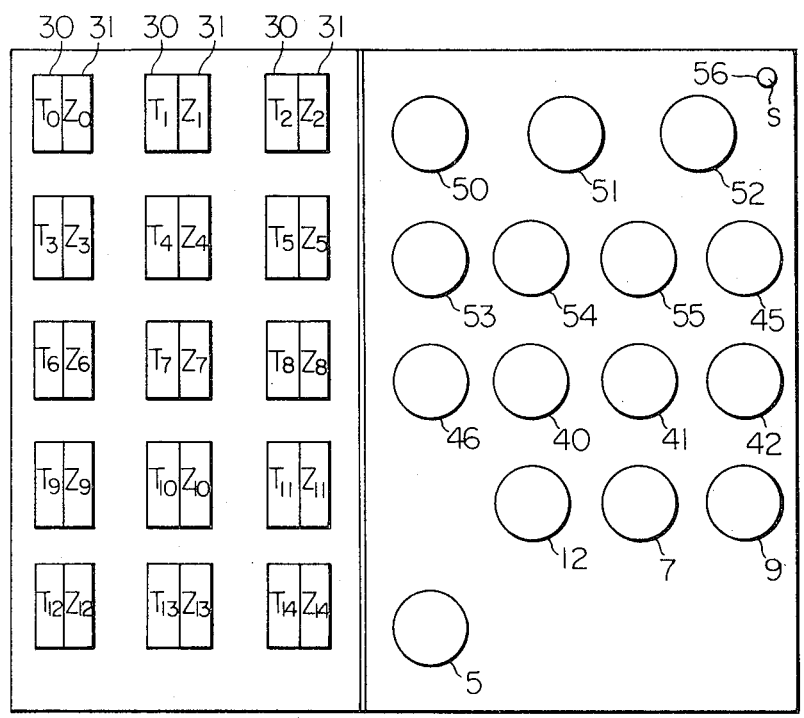

FIG. 3 shows one embodiment of the sound ray path curves displayed by the present apparatus for computing and displaying sound ray paths, FIG. 4 is a schematic block diagram of one embodiment of the present invention, illustrating an apparatus for computing and displaying sound ray paths, FIG. 5A through FIG. 5D are four embodiments of an intensity mudulator 13, FIG. 6A through FIG. 6D are four sound ray path curves, which relates to FIG. 5A through FIG. 5D, respectively, FIG. 7 is a detailed blockdiagram of the detections range computer unit C of FIG. 4, FIG. 8 is one embodiment of operator panel of the apparatus according to the present invention.

FIG. 1 shows a typical temperature distribution curve in winter, in which the horizontal axis shows temperature (°F) and the vertical axis shows depth of sea (ft). In FIG. 1, water temperature increases linearly from sea-level to a depth of 100 ft, decreases linearly from 100 ft to 400 ft, and is constant in deeper place. A curve like FIG. 1 is directly obtained through the measurement by a B/T (Bathy-Thermograph), and the curve is used in the present invention for setting the relationship between temperature and depth on the apparatus for computing and displaying sound ray paths according to the present invention.

FIG. 2 shows one embodiment of sound ray path curves displayed by prior art, in which the horizontal axis is the distance from the sound source in kyd, the vertical axis is the depth from sea level in $ft$, the source is installed 90 ft below the sea level, and sea bottom is a rising slope of 0.8°. In FIG. 2, an object in area P can not be detected since there is no sound path in the area, while an object in area Q where are many sound paths seems to be able to be detected. However, since all the sound ray path curves in FIG. 2 are solid lines, the boundary of the detections range of the sonar system can not be found from the curves of FIG. 2 and, therefore, an object in the area Q is not always found by the sonar system.

FIG. 3 is one embodiment of sound ray path curves according to the present invention, in which each external condition is the same as that in FIG. 2. In FIG. 3, the sound ray paths out of the detection range of the sonar system are displayed with broken lines, which is discriminated from the solid lines of the sound ray paths within the detection range. Accordingly, it is easily recognized that an object located in a broken line area can not be detected by the sonar system.

FIG. 4 is a schematic blockdiagram of one embodiment of the present invention. In FIG. 4, A is an analog sound ray path computer unit, B is a display unit which is embodied by a conventional cathode ray tube, a cathode ray type storage tube or a pen-type X-Y recorder, and C is a detection range computer unit. One of the features of the apparatus according to the present invention is that it has the above three units A, B and C, while the prior sound ray path analyzer has only two units A and B, and lacks unit C.

A plurality of pairs of potentiometers (T$i$) 30 and (Z$i$) 31 (FIG. 4), set the water temperature for each sea depth according to the information obtained by a B/T (Bathyl-Thermograph). Preferably, 15 pairs of potentiometers each pair consisting of one (T$i$) 30 and one (Z$i$) 31, are installed, and temperature distribution at 15 different points along a vertical line is set. A sound velocity computer (SVC) 32 computes the sound velocity C$i$ at the given temperature T$i$ and depth Z$i$ by the following equation.

$$Ci = Co + a_1Ti - a_2Ti^2 + b(S - 34) + Pz$$

(1)

where $a_1$, $a_2$, $b$ and P are a positive constant, T$i$ is temperature at $i$-$th$ depth, S is salinity, Z is depth, and Co is sound velocity at To = Z = O, and S = 34. The output of the sound velocity computer (SVC) 32 is applied to inputs of a velocity gradient computer (VGC) 33.

The velocity gradient computer (VGC) 33 computes the gradient or slope of temperature by the following equations.

$$dc/dz = C_{i+1} - Ci/Z_{i+1} - Zi$$

(2)

where C$i$, C$_{i+1}$, Z$i$ and Z$_{i+1}$ are the temperature and depth of ($i$)-$th$ and ($i$+1)-$th$ points. The temperature gradient obtained in the computer (VGC) 33 is applied to a first ray angle computer (FRA) 34, which is also supplied the signal concerning beam direction 40, beam width 41, and display space 42. The first ray angle computer (FRA) 34 computes the angle or direction of the sound ray path from the above information. This computation is performed by obtaining an initial angle from signal 40, 41 and 42 and a succeeding angle from the fact that the sound ray path is an arc on the condition the temperature gradient is constant. When the temperature gradient changes, equation 3 of Snell's law is adopted to obtain the revised initial angle in a new temperature gradient. The sound ray path in a new temperature gradient is also an arc.

$$C_1/\cos\theta_1 = C_2/\cos\theta_2 = \text{constant}$$

(3)

where $\theta_1$ and $\theta_2$ are incidence, angles of the sound ray path at the boundary of mediums of velocity $C_1$ and $C_2$, respectively.

The output of the first ray angle computer (FRA) 34 is applied to the input of a second ray angle computer (SRA) 35, which is also supplied information concerning the sea level reflection 43, sea bottom reflection 44, and slope of sea bottom 45. The second ray angle computer 35 provides the actual direction $\theta$ of the sound ray path considering the reflection at sea level and sea bottom.

The output signal $\theta$ of the second ray path computer 35 is applied to a sine circuit (SIN) 36 and a cosine circuit (COS) 37, where sin $\theta$ and cos $\theta$ are obtained, respectively. The output of the second ray path computer 35 is also applied to the detection range computer unit C through lines 18 and 20. The outputs of sine circuit 36 and cosine circuit 37 are applied to integral circuits (Z) 38 and (X) 39 each other.

The integral circuit (Z) 38 computes a vertical coordinate Z (depth) of a screen by equation (4) and provides its output to a vertical axis of the display unit B through output line 14.

$$Z = Zo + \int C \cdot \sin\theta \, dt$$

(4)

where Zo is source depth and C is instant sound wave velocity. At the same time the integral circuit (X) 39 computes a horizontal coordinate X (distance) of a screen by equation (5) and provides its output to the horizontal axis of the display unit B through output line 15.

$$X = Xo + \int C \cdot \cos\theta \, dt$$

(5)

where Xo is initial distance and C is instant sound wave velocity.

The prior sound ray path analyzer having only an analog sound ray path computer unit A and a display unit B displays the whole sound ray path with solid line, thus the detection range of the sonar can not be displayed. An apparatus for analyzing sound ray paths according to the present invention further comprises a detection range computer unit C, whereby the detection range of the sonar is displayed on each ray path relating to a value of a figure of merit $N_{FM}$ of the sonar system.

The principle for finding the detection range in the present invention is next explained.

Generally, the value of a figure of merit $N_{FM}$ of a sonar system is expressed by formula (6), in which $N_{FM}$ is an effective difference between the source level and the detective receiving level.

$$N_{FM} = SL - (NL - DI + DT) \tag{6}$$

where SL is source level, NL is noise level at a hydrophone (receiving end), DI is receiving directivity index, and DT is detection threshold level.

$N_{FM}$ is generally equal to the maximum allowable one-way transmission loss in passive sonars, or the maximum allowable two-way loss for TS ( = target strength) = 0dB in active sonars.

On the other hand, the whole transmission loss Nw of the sound wave is given by formula (7)

$$Nw = 10\log S + 0.01 f^2 S + \beta N_s + \gamma N b \tag{7}$$

where S is a distance from the sound source and equals $S = \int c dt$, and the sound wave is supposed to diffuse uniformly, f is sound frequency and $0.01 f^2$ equals the loss coefficient of absorption by water, $\beta$ is reflection loss at sea level, Ns is the number of reflection times at sea level from the source to the distance S, $\gamma$ is reflection loss at sea bottom, and Nb is the number of reflection times at sea bottom from the source to the distance S.

Now, at the distance where Nw equals $N_{FM}$ (Nw = $N_{FM}$), the detection probability by the sonar is 50 percent. Accordingly, in the present invention, the distance where Nw equals $N_{FM}$ is the boundary of the detection range of the sonar system. An object within that distance has at least a 50 percent probability of being found while an object outside of that distance has less than a 50 percent probability of being found.

A detection range computer unit C according to the present invention computes the boundary of the detection range for all displayed sound ray paths, and the ray paths or portions thereof which are outside of the detection range are shown by a broken lines. Thus the boundary of the detection range is displayed by the end of the solid lines and start of the broken lines.

In FIG. 4, again, a propagation distance computer (PDC) 3 is an integral circuit, operation of which is synchronized with that of the ray path computer unit A, and provides the distance S (S = $\int c dt$) on output line 16. A propagation loss computer (PLC) 4 is supplied signal S continuously from the propagation distance computer 3, and frequency signal f of the sound wave from a potentiometer 5, and computes the equation 10 logS and $0.01 f^2 S$, where $0.01 f^2$ is loss coefficient by sea water. The output of the propagation loss computer (PLC) 4 is applied to an adder 10 through line 17 and line 17a.

A sea level reflection loss computer (SLL) 6 is supplied the reflection signal at sea level from the ray path computer unit A through line 18, and counts the reflection times Ns; further it is supplied the reflection loss $\beta$ at sea level for each reflection by a potentiometer 7 and computes $\beta Ns$, which is given on output line 19.

A sea bottom reflection loss computer 8 is supplied the reflection signal at sea bottom from the ray path computer unit A through line 20, and counts the reflection times Nb at sea bottom; further it is supplied the reflection loss $\gamma$ at sea bottom for each reflection by a potentiometer 9 and computes $\gamma Nb$, which is given on output line 21.

An adder 10 adds the four analog signals on lines 17, 17a, 19 and 21 and provides the whole transmission loss Nw (nw = 10 logS + $0.01 f^2 S$ + $\beta$Ns + $\gamma$Nb) to a comparator 11 through line 22.

The comparator 11 is supplied said whole transmission loss Nw through line 22 and the value of a figure of merit $N_{FM}$ by a potentiometer 12 through line 23. Though the value $N_{Fm}$ is constant, Nw increases based on the development of distance S, and when Nw exceeds $N_{FM}$ the comparator provides an output signal, which is applied to an intensity modulator (MOD) 13 through line 24.

The output signal of the intensity modulator (MOD) 13 is applied to the display unit B, and modulates the spot intensity of a cathode ray tube, or controls the movement of the pen of an X-Y recorder, to discriminate the detection range of the sonar.

FIG. 5A through FIG. 5D are four embodiments of an intensity modulator 13, and FIG. 6A through FIG. 6D show four example sound ray path curves displayed by the circuits of FIG. 5A through FIG. 5D, respectively.

FIG. 5A is a first embodiment of an intensity modulator 13, in which a square wave oscillator (OSC) 13a of a predetermined frequency is used. The oscillator (OSC) 13a is triggered by an output signal of the comparator (COM) 11 through line 11, and provides an output of a square wave signal of a predetermined frequency, which is applied to the display unit B to modulate the intensity of a cathode ray tube or to move a pen of an X-Y recorder up and down. FIG. 6A is one example of a sound ray path curve displayed by the circuit of FIG. 5A, in which the portion of the sound ray path out of the detection range $X_1$ is displayed with a broken line, and thus the boundary of the detection range of the sonar can be found on a screen. However, since the frequency of the oscillator (OSC) 13 is constant, it is undesirable that the length between each broken element is not equal to each other, due to the change of display velocity of a spot of the sound ray path.

FIG. 5B shows the second circuit 13b of the intensity modulator, which has a line velocity generator (LV) 13b' and a square wave oscillator (OSC) 13" providing an output frequency proportional to the input voltage. A line velocity generator (LV) 13' is supplied deflection signals of horizontal and vertical axis of a sound ray path through line 14 and 15' and the output of the comparator (COM) 11 through line 24. The line velocity generator (LV) 13' computes a displayed line velocity v of the sound ray path from the differences $\Delta Z$ and $\Delta X$ along the vertical axis Z and horizontal axis X by the following equation.

$$v = \sqrt{(a \Delta X)^2 + (b \Delta Y)^2} \div |a\Delta X| + |b \Delta Y| \tag{8}$$

where a and b are constant. The output of the line velocity generator (LV) 13' is applied to the oscillator (OSC) 13", which provides an output frequency proportional to the output voltage of the line velocity generator (LV) 13'. Since the output frequency is proportional to the display speed of the sound ray path, the portion of the sound ray path out of the detection range of the sonar is displayed with a line of equal length dashes as shown in FIG. 6B.

FIG. 5C shows a third embodiment 13C of the intensity modulator. The circuit 13C consists of a monostable multivibrator, which provides only one output pulse just when a sound ray path on a screen comes to the boundary of the detection range. Accordingly, when a display unit B is a cathode ray tube the boundary of the detection range $X_1$ on each sound ray path is displayed with more intensity than the other part of the sound ray path as shown in FIG. 6C.

FIG. 5D shows a fourth embodiment 13d of the intensity modulator 13. The circuit 13d consists of a flip-flop circuit, whose condition is 1 within the detection range $X_1$ and 0 out side of the detection range $X_1$. According to the circuit of FIG. 5D, each sound ray path within the detection range $X_1$ is displayed with a solid line, while the sound ray path outside of the detection range $X_1$ is blanked and is not shown as shown in FIG. 6D.

FIG. 7 is a detailed blockdiagram of the detection range computer unit C of FIG. 4, in which the same reference numbers are used for the same elements.

A propagation distance computer (PDC) 3 has an analog integrator comprising an amplifier 60 and a feedback capacitor 61, and integrates sound velocity C, supplied through line 26, obtaining propagation distance S ($= \int c dt$) on line 16. The circuit for the initial value of the integrator is a conventional type and is not shown in FIG. 7.

A propagation loss computer (PLC) 4 has a logarithm convertor 62 and a potentiometer 5, both of which are supplied signal S through line 16. The logarithm convertor converts its input signal S to logarithm 10 log S, which is applied to line 17. The potentiometer 5 has a plurality of contacts, the value of resistance at each contact being proportional to the square of the frequency $f$. Signal S is applied to the input of the potentiometer 5 and a value of $0.01 f^2 S$ is obtained on output line 17a.

A sea level reflection loss computer (SLL) 6 has a step wave generator 63 and potentiometer 7. The former is supplied information concerning the reflection of a sound wave at sea level through line 18 and gives a step wave Ns on its output line. The amplitude of the output step wave Ns is proportional to the reflection times of a sound wave at sea level. Said step wave Ns is applied the potentiometer 7, which works as a coefficient multiplier, and thus $\beta$Ns is obtained on line 19.

A sea bottom reflection loss computer (SBL) 8 has a step wave generator 64 and a potentiometer 9. The former is supplied information concerning the reflection of a sound wave at sea bottom through line 20 and gives a step wave Nb on its output line. The amplitude of the step wave Nb is proportional to the reflection times of a sound wave at sea bottom. The potentiometer 9 is a coefficient multiplier. Accordingly $\gamma$ Nb is obtained on line 21.

An adder 10 has an amplifier 65, a feedback resistor 66 and input resistors 67, 68, 69 and 70. The resistor 67 is connected to line 17 and supplied the signal 10 logS, the resistor 68 is connected to line 17A and supplied signal $0.01 f^2 S$, the resistor 69 is connected to line 19 and supplied the signal $\beta$ Ns and the resistor 70 is connected to line 21 and supplied the signal $\gamma$ Nb. Thus the adder 10 provides the signal Nw on line 22, the amplitude of which is proportional to the sum of the amplitudes of the four input signals.

As explained before, the signal Nw is compared with the value of a Figure of merit $N_{FM}$ by the comparator 23, which provides an output pulse just when Nw is equal to or larger than $N_{FM}$, and said output pulse triggers an intensity modulator 13 to control a display unit B.

FIG. 8 is one embodiment of the operation panel of the apparatus according to the present invention. In FIG. 8, the same reference numbers are attached to the same elements as in FIG. 4. On left part of the panel, there are 15 pairs of potentiometers 30 ($T_o - T_{14}$) and 31 ($Z_o - Z_{14}$). Each pair of potentiometers Ti and Zi provide temperature information for one depth based on the measured information obtained by the B/T (Bathy-Thermograph) from a sampling of the fifteen depth as in FIG. 1. For instance, suppose that the temperature at sea level is 76.5°F. $T_o$ is set at 76.5 and $Z_o$ is set at zero.

Switches 50 and 51 set reduced scales of the display unit B, wherein switch 50 sets a reduced scale for horizontal distance and switch 51 sets a reduced scale for vertical depth. Switch 52 selects the circuit according to the type of display unit B, a conventional CRT, a cathode ray type storage tube or pen type X-Y recorder. Potentiometers 45, 53, 54 and 55 provide the conditions at sea bottom, wherein potentiometer 45 designates the slope of the sea bottom, potentiometer 53 designates the depth of the sea bottom directly below the sonar, potentiometer 54 designates whether or not the sound wave reflects at sea bottom, and potentiometer 55 designates the phase of the reflected sound wave at sea bottom. Potentiometers 40, 41, 42 and 46 provide the conditions of sound source, wherein potentiometer 40 designates the direction of the sound beam. Potentiometer 41 designates the width of the sound beam, potentiometer 42 designates the angle of interval space of the displayed sound ray paths, and potentiometer 46 designates the depth of the sound source below the sea level. Potentiometer 12 designates the value of a Figure of merit $N_{FM}$ of the sonar. Potentiomater 7 designates the value of each reflection loss at sea level. Potentiometer 9 designates the value of each reflection loss at sea bottom. Potentiometer 5 designates the frequency of the sound wave.

After designating each value by the above switches and potentiometers, the pressing of a button switch (S) 56 starts the computation of the sound ray paths by the circuit of FIG. 4, and sound ray path curves as in FIG. 3 are shown on a screen of the display unit.

As explained above, a method according to the present invention displays the sound ray path within the detection range of the sonar with a solid line, and discriminates the detection range by displaying the sound ray path outside of the detection range with, for instance, broken lines. Therefore, the detection range of the sonar is clearly displayed on a sound ray path shown on a screen. Further, said detection range is independently displayed on each sound ray path, and thus a group of sound ray paths can display an area composing the detection range.

Since a method according to the present invention compares the whole transmission loss Nw with the value of a figure of merit $N_{FM}$ for each sound ray path during the computation of the sound ray path, the detection range along each sound ray path is correctly computed and displayed when the sound ray path is displayed.

Further, the frequency f of the sound wave, reflection loss at sea level $\beta$ and sea bottom $\gamma$, and the value of a figure of merit $N_{FM}$ are easily designated by potentiometer. The change of the designation by potentiometers makes it possible to study the influence of any parameter changes.

From the foregoing, it will now be apparent that a new and improved method for computing and displaying sound ray paths has been found. It should be understood, of course, that the embodiment disclosed is merely illustrative and is not intended to limit the scope of the invention. Reference should be made to the appended claims, therefore, rather than to the specification as indicating the scope of the invention.

Finally, reference numbers and symbols used in this specification are enumerated below.

A analog ray path computer unit
B display unit
C detection range computer unit
3 propagation distance computer (PDC)
4 propagation loss computer (PLC)
5 potentiometer (f)
6 sea level reflection loss computer (SLL)
7 potentiometer (β)
8 sea bottom reflection loss computer (SBL)
9 potentiometer (γ)
10 adder (A D D)
11 Comparator (C O M)
12 potentiometer ($N_{FM}$)
13 intensity modulator
13a oscillator
13b oscillator
13b' line velocity generator
13b'' oscillator
13c monostable multivibrator
13d flip-flop
14 output line
15 "
16 "
17 "
17a "
18 "
19 "
20 "
21 "
22 "
23 "
24 "
25 "
30 potentiometer (Ti)
31 potentiometer (Zi)
32 sound velocity computer (SVC)
33 velocity gradient computer (VGC)
34 first ray angle computer (FRA)
35 second ray angle computer (SRA)
36 sin circuit (SIN)
37 cos circuit (COS)
38 integral circuit (Z)
39 integral circuit (X)
40 potentiometer (beam direction)
41 " (beam width)
42 " (display space)
43 sea level reflection information
44 sea bottom reflection information
45 potentiometer (slope at sea bottom)
46 " (depth of sound source (Zo))
47 " (initial distance (Xo))
50 switch (horizontal)
51 switch (vertical)
52 switch (display unit)
53 potentiometer (depth)
54 potentiometer (reflection)
55 potentiometer (phase)
56 button switch
60 amplifier
61 capacitor
62 log convertor
63 step wave generator
65 amplifier
66 resistor
67 "
68 "
69 "
70 "

What we claim is:

1. In a method for computing and displaying sound ray paths of a sonar system by an analog computing method, the improvement comprising the steps of,
   a. computing transmission loss (Nw) of sound waves at the same time as the computation of sound ray path,
   b. setting the value of a Figure of merit ($N_{FM}$) of the sonar system
   c. comparing said transmission loss (Nw) with the value of a figure of merit ($N_{FM}$) of the sonar system,
   and
   d. displaying the computed sound ray paths on a display unit discriminating the sound ray paths within the detection range of the sonar system where transmission loss (Nw) is equal to or smaller than the value of a figure of merit ($N_{FM}$) from the sound ray paths out of the detection range of the sonar system where transmission loss (Nw) is larger than the value of a figure of merit ($N_{FM}$).

2. The method of computing and displaying sound ray paths according to claim 1, wherein said step of computing transmission loss (Nw) comprises the steps of computing the free transmission loss, absorption loss by sea-water, sea-surface reflection loss and sea-bottom reflection loss, and adding said four losses.

3. The method of computing and displaying sound ray paths according to claim 1, wherein the computed sound ray paths within the detection range are displayed by solid lines and the computed sound ray paths outside of the detection range are displayed by broken lines.

4. The method of computing and displaying sound ray paths according to claim 3, wherein said broken lines are of equal length dashes.

5. The method of computing and displaying sound ray paths according to claim 1, wherein a dot is further displayed on each displayed sound ray path on the boundary of the detection range by intensity modulation.

6. The method of computing and displaying sound ray paths according to claim 1, wherein the sound ray path outside of the detection range is blanked out.

7. An apparatus for analyzing and displaying sound ray paths, comprising an analog type ray path analyzer (A), a display unit (B), and a detection range unit (C), said detection range unit comprising
   a. means for computing propagation distance S from sound velocity C by the equation ($S = \int C dt$);
   b. means for computing free transmission loss and absorption loss by sea-water by the equation ($10 \log S + 0.01 f^2 S$), where $f$ is sound frequency;
   c. means for computing sea-surface reflection loss by the equation ($\beta Ns$), where $\beta$ is reflection loss at sea level and $N_s$ is the number of reflection times at sea level from the source to the distance S;

d. means for computing sea-bottom reflection loss by the equation ($\gamma N b$), where $\gamma$ is reflection loss at sea bottom, and $Nb$ is the number of reflection times at sea bottom from the source to the distance S;

e. an adder for obtaining the analog value ($10 \log S + 0.01 f^2 S + \beta N_s + \gamma N b$);

f. means for comparing the output of said adder with the value of a figure of merit $N_{FM}$, and providing the output signal when the former exceeds the latter; and g. a modulator for modulating the intensity of said display unit according to the output of said comparison means, said display unit being connected to receive inputs from said analog type ray path analyzer and said modulator, and said detection range unit (C) being connected to receive inputs from said analog type ray path analyzer.

* * * * *

UNITED STATES PATENT OFFICE
CERTIFICATE OF CORRECTION

Patent No. 3,832,537   Dated August 27, 1974

Inventor(s) Yasumasa Marutani

It is certified that error appears in the above-identified patent and that said Letters Patent are hereby corrected as shown below:

Column 1, line 60, change "fluid" to --field--.

Signed and sealed this 3rd day of December 1974.

(SEAL)
Attest:

McCOY M. GIBSON JR.
Attesting Officer

C. MARSHALL DANN
Commissioner of Patents